Dec. 13, 1966    R. W. CORNELL    3,290,915
MACHINE FOR COLD-ROLLING A NONUNIFORM SURFACE
Filed April 30, 1964    6 Sheets-Sheet 1

FIG.1

INVENTOR
ROBERT W. CORNELL
BY Norman Friedland
ATTORNEY

United States Patent Office 3,290,915
Patented Dec. 13, 1966

3,290,915
MACHINE FOR COLD-ROLLING A NONUNIFORM SURFACE
Robert W. Cornell, West Hartford, Conn., assignor to United Aircraft Corporation, East Hartford, Conn., a corporation of Delaware
Filed Apr. 30, 1964, Ser. No. 363,941
10 Claims. (Cl. 72—240)

This invention relates to a machine for cold working the surface of a nonuniformly shaped article and particularly to a machine adapted to increase the fatigue strength of a propeller blade.

It is customary practice in industry to increase the strength of aluminum propeller blades by subjecting them to a cold working shot peening operation. An inherent disadvantage of this process is that occasional broken shots hitting the blade cause local cuts and "folds" in the surface which produce stress raises which are detrimental to the fatigue strength life of the blade. To eliminate this disadvantange, it has been found that the surface of the blade can be rolled, otherwise known as cold working. However, it is of paramount importance when cold working a surface that a controlled rolling contact pressure be applied to the surface so that the depth of the cold worked surface meets a predetermined specification dictated by the application and loads to which the blades are eventually subjected. Particularly in aeronautical propeller blades, it is essential that care be exercised in surface working in order to prevent the leading and trailing edges and tip stations of the blades to be overworked so that the depth of the cold worked surfaces thereof does not penetrate the entire thickness causing this area to become brittle. I have found that I can cold work areas of the surface of a propeller blade by rolling these areas under a controlled contact pressure which is constant over certain thick portions of the blade, so as to provide uniform depth of cold work, and which decreases as the thickness of the blade decreases, thereby preventing physical damage to the thin portions of the blade so that the pressure is zero at the thin edges of the blade.

Accordingly, it is an object of this invention to provide a machine which will cold work the nonuniform surface of a specimen by subjecting the specimen to a rolling operation and imposing thereon a predetermined pressure.

It is a further object of this invention to advance pressurized rollers longitudinally and transversely and controlling the application of pressure over the blade when the rollers are moving in the transverse direction.

It is a further object of this invention to automatically cold work a surface of a propeller blade and utilize the machine for cold working the shank portion, which is generally cylindrically shaped, by merely rotating the blades.

It is a further object to provide a mechanism in which the squeeze, or pressure rollers, move either in opposing direction a uniform distance from a fixed horizontal plane or they move equal distance in the same direction from the horizontal plane.

It is a further object of this invention to control the pressure applied to the surface of the blades as a function of the distance between spaced-apart rollers.

Other features and advantages will be apparent from the specification and claims and from the accompanying drawings which illustrate an embodiment of the invention.

Figure 1:
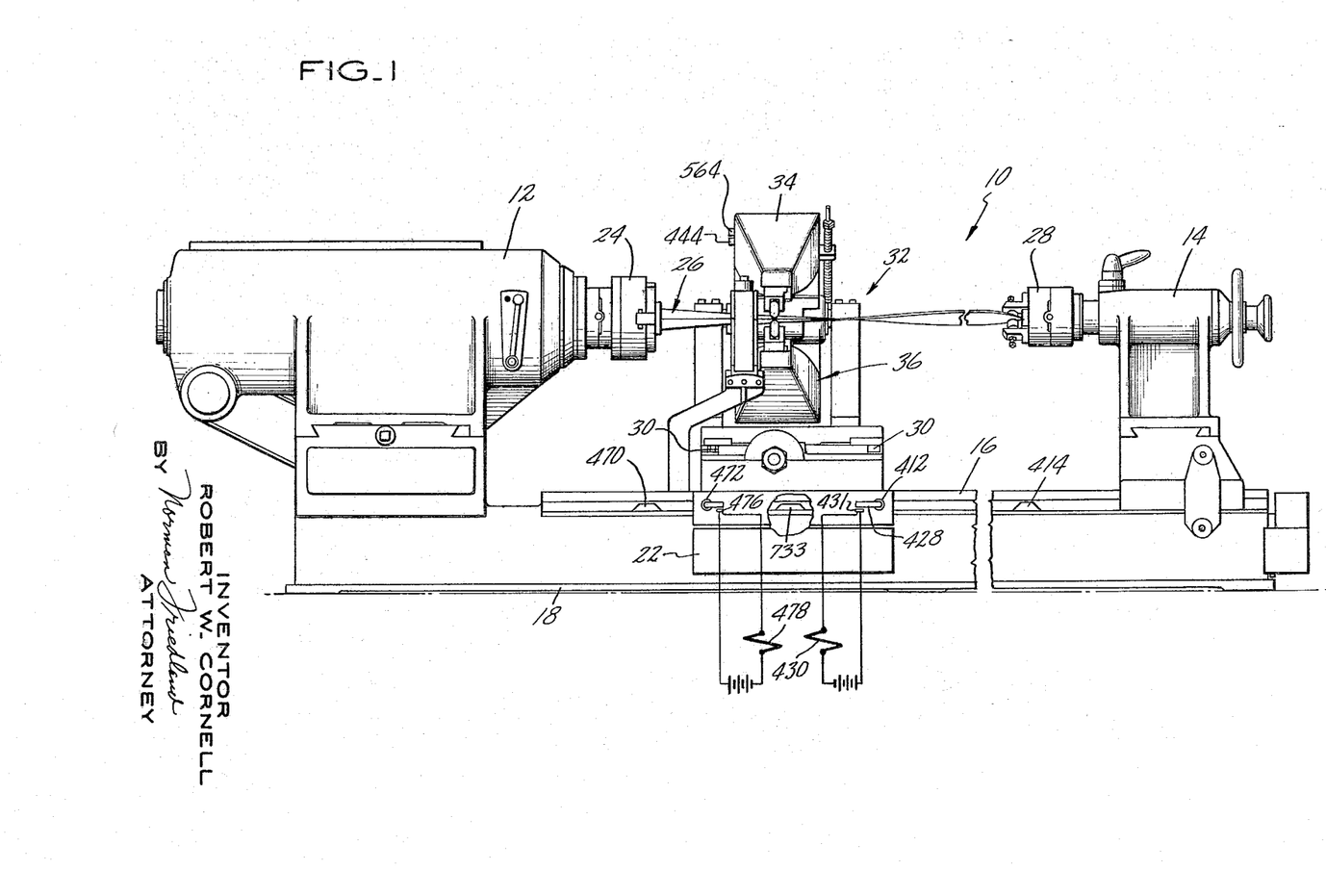
FIG. 1 is a view in elevation showing the machine with a blade being held for cold working.
Figure 2:
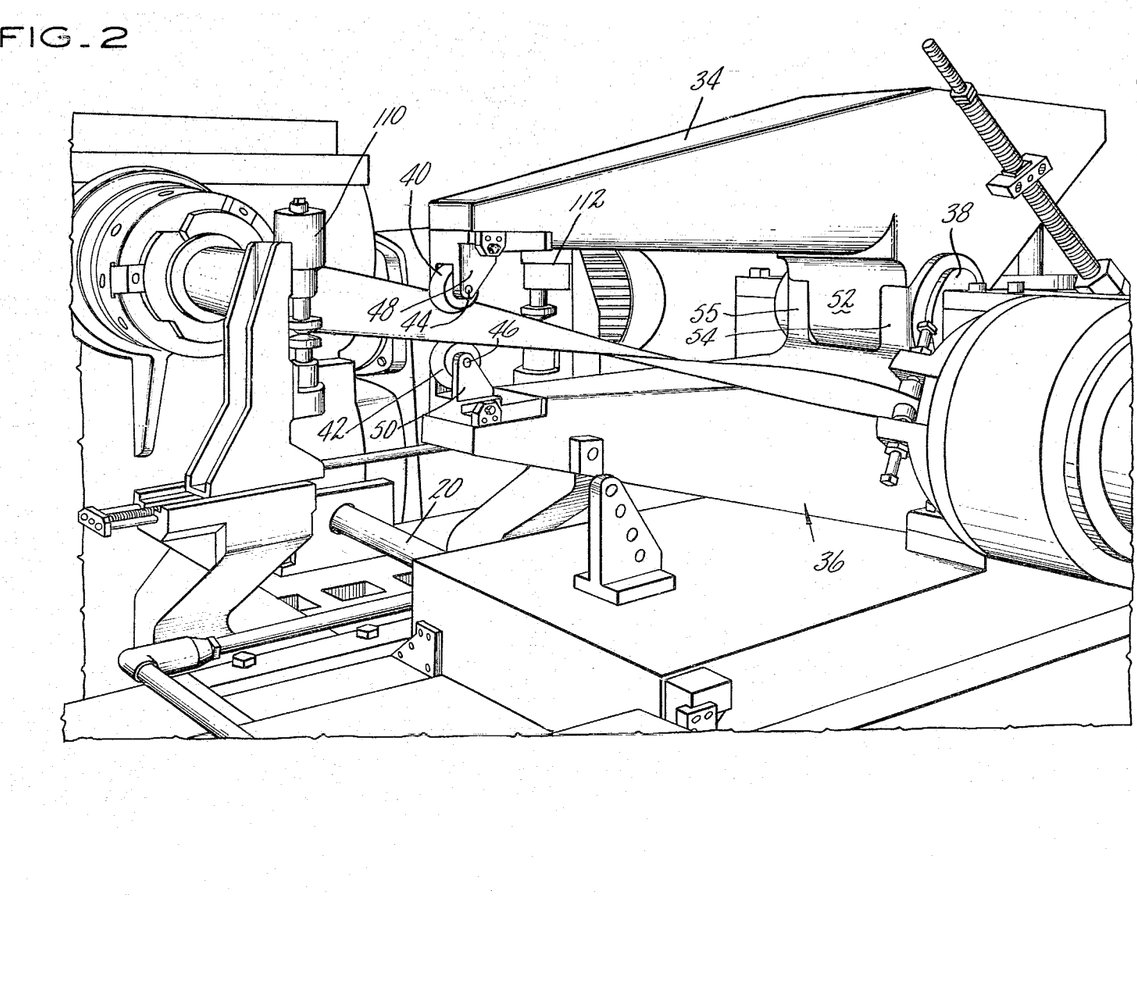
FIG. 2 is an exploded partial perspective view of FIG. 1 showing a close-up of the squeeze rollers.
Figure 3:
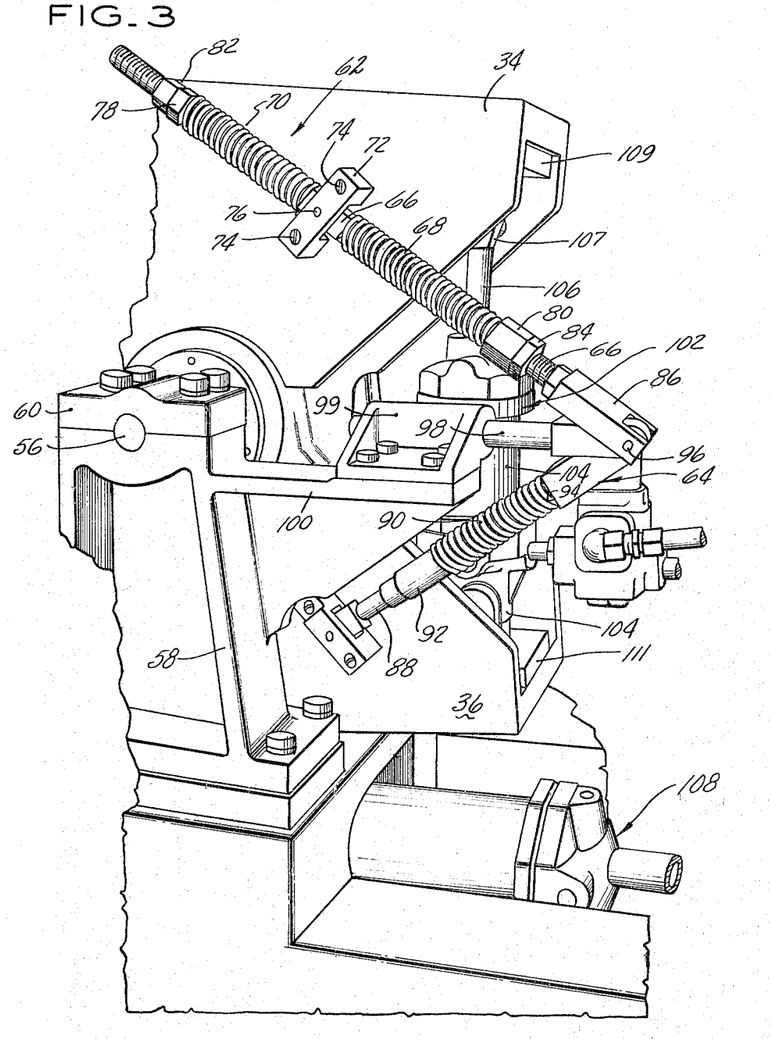
FIG. 3 is another exploded partial perspective view of FIG. 1 showing the roller actuator mechanism.

Reference is now made to FIGS. 1–3 showing the machine generally indicated by numeral 10 comprising a machine bed 18, which supports headstock 12, tailstock 14, and ways 16 extending therebetween. A saddle 22, which is gibbed to ways 16, is longitudinally positioned along the machine by a piston rod 20. The headstock 12 contains suitable mechanism for supporting, rotating at various speeds, stopping, and locking chuck 24. The chuck may be actuated either mechanically, pneumatically or hydraulically to secure one end of a blade, generally indicated by numeral 26. Tailstock 14 suitably supports the other end of the blade by the use of a clamp generally indicated by numeral 28.

Suitable ways 30 on saddle 22 extend transverse to the ways 16 of the machine bed for supporting an oscillating fixture generally indicated by numeral 32. Pivotally mounted about the axis 56 on the oscillating fixture 32 are a pair of roller arms 34 and 36. From FIGS. 1 and 2, it will be noted that pressure rollers 40 and 42 are suitably supported to the ends of roller arms 34 and 36 by yoke members 48 and 50. Axles 44 and 46 are horizontally mounted in yokes 48 and 50, respectively, for rotatably supporting rollers 40 and 42, respectively.

As noted from the drawings, roller arms 34 and 36 pivot about a pivot generally indicated by numeral 38 which is spaced intermediate their ends. Roller arm 34 has depending member 52 which is generally circular in cross section fitting into the space between upstanding members 54 and 55 extending from roller arm 36. The inner surface of the depending member 52 is shaped to conform to the curvature of the circular top surface of members 54 and 55 and serves to support and guide the rotary motion with respect to the two arms. The entire assembly is carried by axle 56 suitably supported in a pair of supporting braces 58 (only one being shown as noted in FIG. 3) which supporting braces are suitably supported to oscillating fixture 32. Covers 60 (only one of which is shown) for restraining and holding axle 56 fits over the axles and is secured to the top of brace 58.

The angular position of the arms 34 and 36 with respect to each other, and hence the distance between rollers 40 and 42, is controlled by a piston assembly 102 acting on the rear ends of the arms 34 and 36 so as to cause pivotal movement of the arms about axis 56. A cylinder 104 which is anchored to arm 36 receives fluid under pressure, as will be described hereinbelow, for moving a piston (not shown) and the piston rod 106 which is connected to the rear end of arm 34.

Referring particularly to FIG. 3, arms 34 and 36 are urged toward positions of equal angular displacement from the horizontal axis of the rod 98 by the spring loading assemblies generally indicated by numerals 62 and 64. Rollers 40 and 42 which are fixed to the arms 34 and 36 are therefore urged toward positions which are always equal distances above and below a horizontal plane. Assembly 62 comprises a threaded shaft 66 surrounded by a pair of compression springs 68 and 70 suitably fixed to the side surface of roller arm 34 by a generally U-shaped member 72. Bolts indicated by numeral 74 anchor this member to the arm 34. Collar 76 fits into U-shaped member 72 and a bore is formed therein to receive shaft 66. This allows axial movement of the shaft responding to lateral movement of the rollers in opposition to the force of the springs. A set of nuts 78 and 80 are attached to abut against the outer ends of springs 68 and 70 respectively and are adjusted to apply the proper compression force thereto. Bifurcated member 86 is attached to the end of threaded shaft 66 for pivotally connecting the ends of rod 98, shaft 66, and spring assembly 64. Variable length spring assembly 64 contains a single compression spring 90 supported to act along the axes of rod 88 and spring retainer 94. The end of rod 98, which is free to move within cylinder 99, is attached to shaft 66 and spring assembly 64 by pin 96. Cylinder 99 is bolted to arm 100 which is part of the oscillating fixture 32. It is apparent that the spring assemblies tend to keep the arms and hence rollers in a position of equal distance from a fixed horizontal plane. Of course, because of nonuniformity of the blade surface equal distance is only achieved at points of symmetry of the blade.

Oscillating fixture 32 is translated along the ways 30 on saddle 22 by the hydraulic piston assembly generally indicated by the numeral 108. This mechanism will also be described hereinbelow.

The machine includes guide members generally indicated by numerals 110 and 112 which aid in angular positioning of the blade. These guide members are fixed to and movable with saddle 22 and are manually adjusted.

From the foregoing it is apparent that the headstock 12 and tailstock 14 serve to support the specimen horizontally and as will be appreciated secure the blade in a restrained position when the oscillating fixture 32 moves transversely across the blade. The rollers are positioned transversely by virtue of the actuating piston assembly 108. The saddle is positioned longitudinally by the hydraulic piston (not shown) connecting to piston rod 20. Thus, it is apparent that the pressure rollers are sequentially operated so that they are positioned at a particular station. Then they are actuated to roll transversely across the blade, then positioned longitudinally to another station and again are actuated to roll transversely across the blade. This sequence is continued until the area which is intended to be cold worked has been completely processed. As will be explained hereinbelow, the rollers press against the blade at a predetermined position spaced from a leading and trailing edge of the blade. This will be more fully understood in connection with an explanation of FIG. 4.

Figure 4:
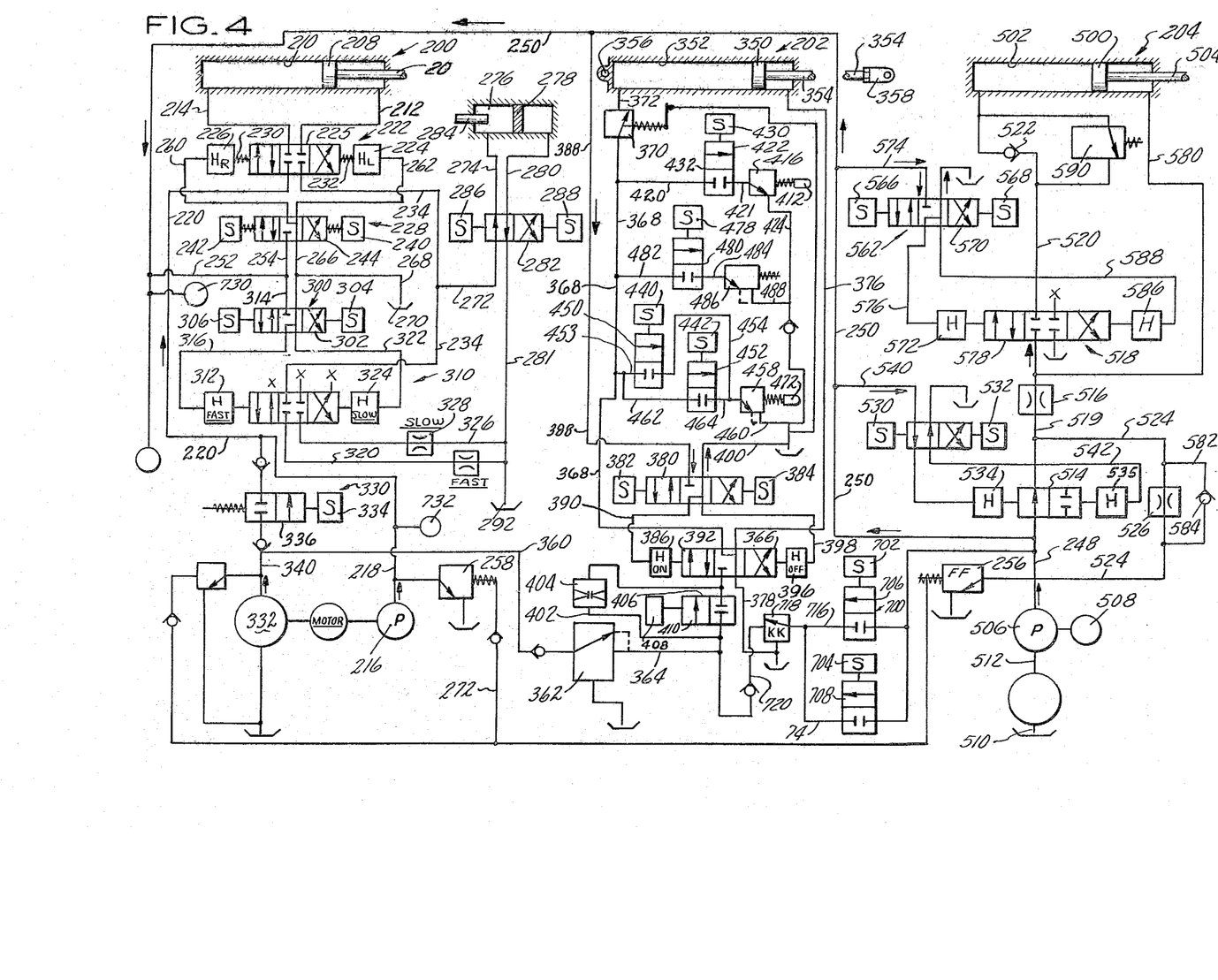
FIG. 4 is a schematic illustrating the hydraulic flow circuit for controlling the machine.

Now referring to FIG. 4 which shows schematically the hydraulic circuit which serves to position the rollers and control the pressure applied to the surface of the specimen. Basically, the control for the machine serves to feed hydraulic fluid for positioning three hydraulically actuated pistons generally indicated by numerals 200, 202 and 204. Hydraulic piston 200 serves to control the position of the saddle 22 through piston rod 20. Piston 208 reciprocally mounted in cylinder 210 is of the half-area type having one surface in the cylinder being half the area of the other surface so that when the pressure acting on the larger area is one half the pressure acting on the smaller area, the piston will be at equilibrium.

The longitudinal feed serves to move the saddle either in a continuous feed or in a step, or incremental feed. The continuous feed is primarily used for slow or rapid longitudinal repositioning of the rollers at the completion of the operation on one blade and in preparation for receiving another.

As noted from FIG. 4, hydraulic fluid is fed into cylinder 210 on both the left and right side of piston 208 by the hydraulic connecting passages 212 and 214. Supply pressure from pump 216 is supplied to either passages 214 or 212 by valve 222 via passages 218 and 220. The direction of movement of the piston is determined by the directional control valve 222. While the valves in FIG. 4 are shown schematically any suitable valves may be used in this system. Directional control valve 222 includes a pair of hydraulic actuators 224 and 226 mounted on either side of the valve for translating the valve body 225. These actuators are controlled by a pilot valve generally indicated by numeral 228. Springs 230 and 232 serve to urge the valve 225 toward its neutral position as shown in the drawing. In this position, the connection between passage 220 and passages 212 and 214 is blocked. In order to open these connections, directional control valve 22 is moved to either the left or the right depending on the actuation of actuators 224 or 226. To position it to the left, it is necessary to actuate actuator 224 and to position it to the right, it is necessary to acutate actuator 226. For example, to move the piston rod 20 to the right actuator 226 is actuated by pilot valve 228, positioning valve spool 225 to the right connecting passage 220 with passage 214 and passage 212 with passage 234. In this position hydraulic fluid is directed into cylinder 210 to act on the left side of piston 208 causing it to move to the right. The movement of the piston is controlled by the flow in drain line 234 as will be described herein.

Pilot valve 228 is positioned by a pair of manually actuated electrical solenoids 240 and 242 which are disposed on opposite ends of the pilot valve body 244. By actuating solenoid 240, pilot valve 244 moves to the left and by actuating solenoid 242, pilot valve 244 moves to the right. Hydraulic supply fluid from pump 506 is directed to the pilot valve body 244 by passages 248, 250, 252 and 254. The pressure in these passages may be regulated at, for example, 500 pounds per square inch (p.s.i.) by a standard type of pressure regulating valve 256. The pressure in passages 218 and 220 may be maintained at a value of 500 p.s.i. by pressure regulating valve 258. For reasons mentioned in the description which follows a pair of pumps of different flow rates are used in this machine rather than a single supply pump.

To move piston rod 20, and hence saddle 22 to the right, the machine operator manually activates solenoid 242 thereby positioning pilot valve 244 to the right for interconnecting passages 254 and 260 and passages 262 and 266. This serves to direct pressurized fluid to actuator 226 and drain any fluid in actuator 224 to the system sump, or drain 270, thereby allowing directional control valve 222 to move to the right which, in turn, directs high presure fluid egressing from supply line 220 to passage 214 as well as connecting passage 212 with passage 234. Similarly, to move the saddle to the left the machine operator would actuate solenoid 240. The character of the movement of the saddle, that is, whether it is slow continuous, fast continuous, or incremental step feed is determined by the flow path open to the cylinder drain line 234.

The following describes the step feed mechanism. Branch line 272 interconnects passage 234 and either the left or right side of free floating piston 278 depending on the position of the solenoid operated control valve 282. A mechanically adjusted stop 284 is employed to limit the distance of travel of piston 278. Control valve 282 is actuated by a pair of solenoids 286 and 288 which, in turn, are actuated by the cam bar 760 and switch 772 mounted on the oscillating fixture. Switch 772 is operated as a function of the distance between rollers 40 and 42. In the position shown in FIG. 4, fluid in passage 234 is directed to act on the left side of piston 278 via passage 272, pilot valve 282 and passage 274, while the right side of piston 278 is directed to drain through passage 280, control valve 282, and passage 281. Thus, as fluid is directed out of cylinder 210 and into cylinder 276 via passages 234 and 272, and control valve 282, piston 278 by virtue of the high pressure fluid on its left end moves toward the right forcing fluid out of the right side of cylinder 276 through passage 280, control valve 282 and passage 281. When the free floating piston 278 has reached the end of its travel, that is, the end of cylinder 276, further flow in line 234 is prevented and the piston 208 will stop.

From the foregoing it is apparent that the distance that piston 278 travels determines the displacement or incremental movement of piston 208. As noted, by virtue of the free floating piston, the piston 208 has moved a predetermined increment. It is held in that position until solenoid 288 is actuated. To move it to the next incremental position, solenoid 288 is automatically actuated by virtue of the aforementioned cam bar and switch mounted on the oscillating fixture, which in turn, is actuated by the distance between rollers 40 and 42. This serves to move pilot valve 282 to the left interconnecting passage 272 with passage 280 and passage 274 with passage 281. With valve 282 in this position, the piston 208 can move another incremental distance, or step, while piston 278 moves from right to left in the cylinder 276. Piston 208 will remain in this position until the other solenoid is automatically actuated. It thus can be seen that piston 208 will be step fed an increment determined by the displacement of free floating piston 278, which step feeding is automatically controlled by control valve 282 and its controlling solenoids 286 and 288 which are, in turn, actuated by the distance between rollers 40 and 42.

While the explanation just given to illustrate the operation of the longitudinal feed as controlled by piston 208 and its attendant controlling mechanism has been concerned with positioning piston rod 20 to the right, it is to be understood that step feed control may also be utilized to position this mechanism to the left. This is accomplished by merely actuating solenoid 240 instead of 242 which serves to position pilot valve 244 to the left which, in turn, actuates actuator 224 and connects actuator 226 to drain in a manner similar to that which was described in connection with the operation of this valve to the right.

As was indicated above, the longitudinal feed either to the left or right may be continuous and it may be made to operate at a slow and a relatively fast speed. For this purpose, pilot valve 300 which is identical to pilot valve generally indicated by numeral 228 comprising spool member 302 is either positioned to the left or right by virtue of energizing solenoids 304 and 306. This position determines the slow or the fast feed. Assuming that it is desirable to move the longitudinal feed at the fast rate, the following sequence will be initiated. Solenoid 306 is actuated by the machine operator which serves to position spool 302 to the right. This interconnects supply passage 252 and actuator 312 via line 314, valve 302, and line 316. Valve 310 moves to the right interconnecting passage 234 with passage 320 and eventually connecting to passage 281 and drain 292. A fixed restriction 321 is disposed in passage 320 and serves to meter the fluid at a rate commensurate to the rate of movement of the longitudinal feed desired.

To obtain slow continuous feed, the machine operator energizes solenoid 304 which positions valve 302 to the left for interconnecting passage 314 and passage 322 for positioning actuator 324 and valve 310 to the left to interconnect passage 234 and passage 326 which eventually conducts fluid to drain through passage 281. A fixed restriction 328 being smaller than restriction 321 is disposed in passage 326 for metering the fluid at a rate which is commensurate with the desired slow longitudinal continuous feed.

It will be appreciated that in order to obtain the proper direction either solenoid 240 or 242 is energized in the manner that was described in connection with the step feed operation. This serves to give the proper directional control for piston rod 20 in the manner just described in connection with this step feed operation. It will be appreciated in viewing FIG. 4 that when the solenoid control valves 228 and 300 are in the inoperative connection, the control valves 222 and 310 have all their respective actuators connected to drain by the respective drain lines as shown therein.

To assure that the longitudinal feed is properly operating, additional fluid is supplied to the cylinder 210 by virtue of the solenoid actuator valve generally indicated by numeral 330. This solenoid actuator valve which is mechanically actuated by the machine operator serves to interconnect an additional pump 332 to assure that sufficient hydraulic fluid is conducted to chamber cylinder 210. To accomplish this, solenoid 334 is energized for positioning the spool 336 to the left which interconnects pump 332 and passage 220 via passages 340. This merely serves to provide an additional amount of fluid for the proper operation of the longitudinal feed when in its rapid movement.

Still referring to FIG. 4, it will be appreciated that the hydraulic piston 202 controlling the distance between the rollers 40 and 42 comprises a half-area piston 350 disposed in cylinder 352 and a piston rod connected to one end of the piston 354. Schematically illustrated are a pair of attaching members, one of which, referred to as numeral 356, is attached to one end of the cylinder and the other, referred to as numeral 358, is attached to the end of the piston rod 354. Referring for the moment to FIG. 3, it will be appreciated that piston rod 354 corresponds to the piston rod 106 and the attaching member 358 corresponds to attaching member 107. Member 107 is suitably attached to the L-shaped member 109 which is fixedly secured to an inner surface of the roller arm 34. Cylinder 104 which corresponds to the schematic illustrated cylinder 352 attaches to the inner surface of roller arm 36 by the L-shaped member 111. Thus, it is apparent that the force exerted by the fluid acting in cylinder 352 against piston 350 and the end wall of cylinder 352 exerts a force equal and opposite in direction so that the force exerted on roller arm 34 equals the force exerted on the roller arm 36.

The force pushing the rollers together is equal to the piston output force times the machine lever ratio.

As noted above, the purpose of piston assembly 202 is to squeeze the rollers toward each other. The squeeze force is controlled to provide a rolling pressure force which will impose the required pressure on the surface of the specimen or blades to be worked. The control mechanism for this piston, which will be described immediately hereinbelow, is designed to impose a constant roller pressure over certain thick areas of the blade while providing variable pressure over areas of the blade having variable thickness and zero pressure at the thin edges of the blade.

As will be more fully explained hereinbelow, the pressure is scheduled so that at the trailing and leading edge the pressure will be built up and reduced gradually so that no abrupt change in pressure between a non-worked and surface worked area will be evidenced, and likewise toward the shank and tips of the blade, the pressure will be built up and reduced gradually so that there also is no abrupt change in pressure between the non-worked and surface worked area.

Figure 7:
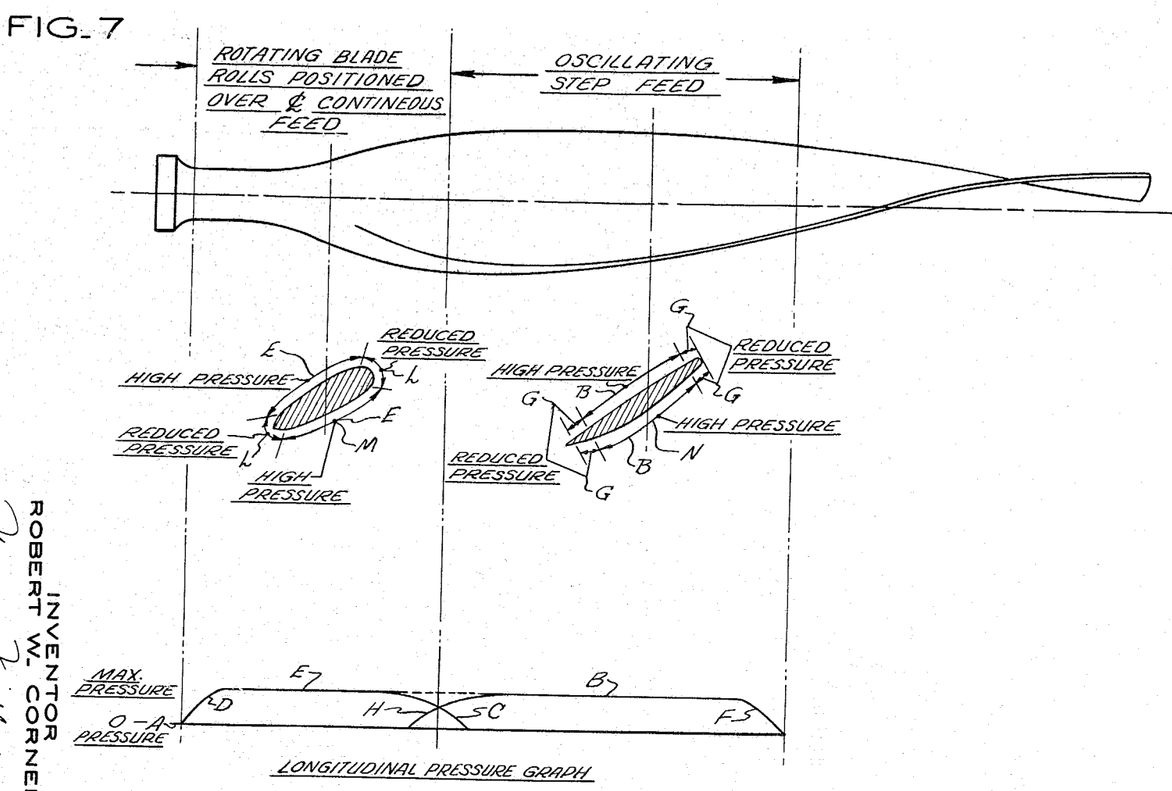
FIG. 7 is a graphical representation showing the pressure gradient along various stations of the cold worked blade.

For the moment, reference is hereby made to FIG. 7 which shows the profile of a propeller blade to be processed on the cold-rolling machine. As noted, not only does the blade contain a twist about the longitudinal axis but the thickness of the blade varies from tip to shank. Obviously, the cross-sectional shape of the root of the blade is substantially circular and it flares into an air-foil shaped portion. The pressure graph in FIG. 7 shows the pressure pattern longitudinally of and transversely across the blade and is for the purpose of illustrating the necessary requirements of the machine for properly cold working the surface of the propeller blade and assuring the increased fatigue strength life while preventing certain portions of the blades from becoming brittle. Line A illustrates the zero pressure point and lines E and B represent the maximum pressure points. It will be noted from the drawing that the pressure at the shank of the blade is gradually increased along line D until it reaches the maximum pressure illustrated by line E. Then the pressure is gradually reduced along line C at the transitional point separating the root of the blade from the airfoil section. When continuing the operation at the transitional point, it will be noted that there is an overlapping between line C and line H which indicates that the pressure is increased along line H until it reaches line b where it is held constant until reducing in pressure along line F. From this station of the blade to the tip, no cold-working is contemplated since this portion of the blade is relatively thin. The cross-sectional portion of blades taken along the chord-wise axis illustrated by letters M and N are shown to illustrate the pressure gradient along the transverse direction. Here it will be noted that the pressure is held at a maximum value intermediate the leading and trailing edges illustrated by lines G. Hence, at the shank portion of the blade, the pressure is held to the maximum as shown by line E and the pressure is gradually reduced as shown by the lines L. Along the airfoil section the pressure is held constant intermediate the leading and trailing edge as illustrated by the letter B and the pressure is reduced at trailing and tip station as illustrated by the lines G.

Referring back to FIG. 4, it can be seen that pressurized fluid from pump 332 is admitted into cylinder 352 on the left side of piston 350 via passages 340 and 360, pressure regulating valve 362, passage 364, valve 410 or bypass 404, control valve 366, passage 368, pressure regulator 370 and passage 372. The right side of piston 350 is connected to drain via passage 376, control valve 366 and passage 378. To place squeeze piston 202 into operating condition, control valve 366 is actuated by the solenoid operated pilot valve 380. Solenoid pilot valve 380 responds to a pair of electrically actuated solenoids 382 and 384. Assume it is desirable to place the squeeze piston 202 in the operating condition, solenoid 382 is energized shifting pilot valve 380 to the right and connecting pressurized fluid from line 250 to actuator 386 via lines 388 and 390. This causes spool 392 of control valve 366 to move to the right interconnecting passages 364 and 368 for directing pump pressure into cylinder 352.

It will be noted from the drawing that when pilot valve 380 shifted to the right, actuator 396 is connected to drain through lines 398 and 400. Also, line 376 is connected to drain through line 378. Pressure regulating valves 362 and 370 may be of any standard suitable type of pressure regulating valve and serve to maintain the pressure in cylinder 352 at 800 p.s.i. This corresponds to the pressure illustrated in FIG. 7 by lines B and E.

As in any standard type of pressure regulator, a valve operates against a spring which is preset at the required pressure desired to be maintained. When the pressure acting against the valve exceeds the value of the spring, the valve is diverted to direct flow back to drain. In this type of pressure regulator, it is necessary to supply from the pump a pressure which exceeds the pressure controlled by the pressure regulator. This is to assure that the pressure eventually obtained by the regulator equals the value desired. The excessive pressure put out by the pump is to make up for frictional losses and pressure drops occurring through the various flow paths.

It is desirable in operation to assure that the rollers do not impinge upon the blade with a great deal of force upon initial contact. This is prevented by providing the by-pass line 402 and the restrictor 404 disposed therein. Flow in this line bypasses the solenoid operated control valve 406 so that the flow is metered through the restrictor into the chamber of cylinder 352. However, for normal operation and during the working of the blade except for the initial starting, solenoid 408 is normally energized by the machine operator for positioning spool 410 to the right and interconnecting lines 364 and 368.

Assuming it is desirable to work the blade from the tip to the shank and that squeeze rollers have been actuated by actuating solenoid 382 and solenoid 408, it will be appreciated that saddle 22 will be at the far right end of the blade. In this position, follower 412 engages cam 414 which cam is rigidly secured to the machine bed 18. The follower, it will be noted, will be at the high point of cam 414, which cam follower is schematically illustrated in FIG. 4 as 412. This urges valve 416 to the left interconnecting line 368, line 420, solenoid actuated valve 422, and passage 424 which eventually connects to drain. Simultaneously, the cam follower which is connected to lever 428 engages switch 431 which energizes solenoid 430 (shown in FIGS. 1 and 4). This urges spool valve 432 of solenoid actuator valve 422 downward to interconnect lines 420 and 421. When in this position, the valve is in its wide open position bleeding flow from line 368 to drain so that the pressure acting on piston 350 is somewhat less than 800 p.s.i. This corresponds to the low point of pressure line F. As saddle 22 advances to the left, it will be appreciated that follower 412 is urged downwardly along the cam surface and commences to reduce the metering area of valve 416 and allows the pressure in chamber 352 to increase. This increases the force acting on piston 350 which eventually builds up to the 800 p.s.i. value. It will be appreciated that the longitudinal movement is in the step feed operation as was described above.

Figure 6:
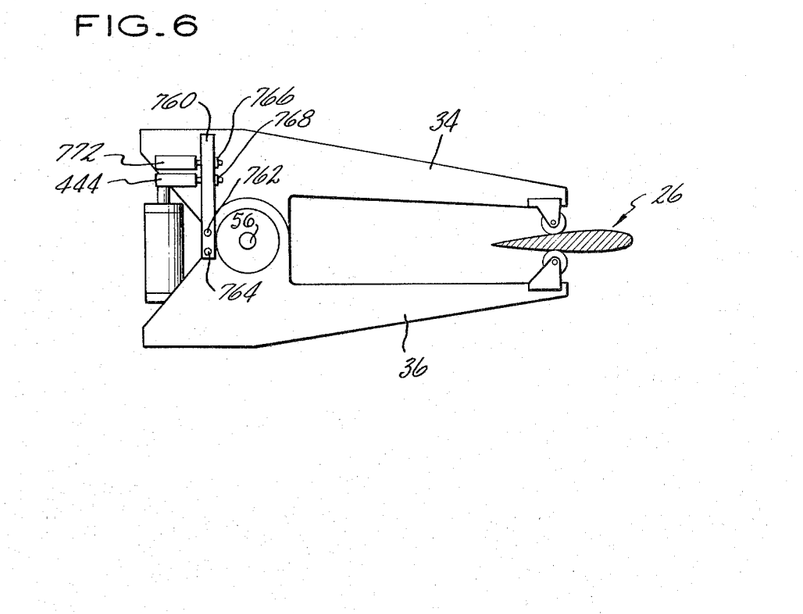
FIG. 6 is a schematic view showing the cam and actuating switches responding to the position of the rollers.

Intermittently the oscillating fixture and the squeeze rollers are actuated to cold work the surface of the blade 26. To assure that the leading and trailing edges are not cold worked and that the pressure is gradually reduced in accordance with pressure lines G illustrated in FIG. 7, solenoid valves 440 and 442 are provided. While these valves are connected in parallel, it will be appreciated that a single valve will serve the same purpose. They are provided in this way to assure that sufficient volume of fluid is drained from line 368. Solenoids 440 and 442 respond to a solenoid switch 444 attached to roller arm 34. This switch is triggered as a function of the distance between the rollers (FIG. 6). When the distance between the rollers reaches a predetermined value; namely, at the points where lines G intersect line B of FIG. 7, solenoids 440 and 442 are energized shifting spools 450 and 452 respectively to interconnect line 368 with drain via lines 453 and 454, regulating valve 458, and passage 460 and passage 424 and passage 462, valve 452, passages 464 and 456, pressure regulator valve 458 and passage 460. Pressure regulator which may be substantially similar to pressure regulator 370 serves to maintain the pressure at a value of say 600 p.s.i. Thus it will be appreciated that the pressure selected may be between 600 p.s.i. corresponding to the low pressure point of lines G of FIG. 7 and 800 p.s.i. corresponding to the high pressure point illustrated by line B of FIG. 7. It is contemplated within the scope of invention that the pressure decreasing mechanism may also be actuated by sensing the longitudinal displacement of the oscillating fixture as well as the thickness of the blade or the combination thereof.

For obtaining the decrease of pressure as the rollers approach the shank portion of the propeller blade, the cam 470 of FIG. 1 is provided which has an incline surface similar to the one described in connection with cam 414 but facing the opposite direction. A cam follower 472 engages the cam surface and rides up the surface to provide the pressure gradient illustrated by line D of FIG. 7. The cam follower is connected to energize switch 476 which, in turn, energizes solenoid 478 for positioning valve 480 and interconnecting passage 368 to drain via lines 482, 484, pressure regulating valve 486 and passage 488, and eventually to drain through passage 424.

As noted above, hydraulic piston generally indicated by numeral 204 serves to position the oscillating fixture generally indicated by numeral 32. Like hydraulic pistons 200 and 202, the hydraulic piston 204 comprises a half-area piston 500 disposed in cylinder 502 and having connected thereto piston rod 504. This piston utilizes a separate and independent pumping system; however, it is not intended to be limited thereto since one pumping unit may be sufficient to handle the hydraulic demands of all the various component systems. However, we have found that it is possible to utilize separate pumping systems having different flow capacities to minimize on the power consumption. During certain operations to be described hereinbelow, it is desired to have high flow capacities which are not necessary during the normal operation of the machine. Hence, it is possible to cut into one of the pumping systems as disclosed by this invention during peak requirements of fluid. The pumping system here comprises a pump generally indicated by numeral 506 driven by an electrically driven motor 508 which pressurizes fluid from tank 510 and directs it through line 512. It will be appreciated that the fluid directed to the cylinder 502 acting on the fore end of piston 500 takes one of two flow paths, first of which includes a speed control valve 514, a fixed restriction 516, directional control generally indicated by numeral 518, through passage 520, and through check valve 522 disposed therein. The alternate flow path is a bypass loop consisting of line 524 and restrictor 526 disposed therein. It will be noted that the pressure of this line is maintained at constant value by the use of pressure regulator 256, which pressure regulator is identical in operation as that described in connection with pressure regulator 370. This pressure regulator serves to maintain the pressure in line 248 at say 500 p.s.i. In order to obtain the fast or slow transverse operation of the oscillating fixture, either solenoid 530 or 532 is energized. Solenoid 532 serves to actuate actuator 534 for positioning feed control valve 514 in the slow rate of movement and energizing solenoid 530 actuates actuator 535 for positioning valve 514 for a fast rate of movement. As shown in the drawing, speed regulating valve 514 is in the fast moving position allowing direct communication between lines 248 and 519. Energizing solenoid 532 positions solenoid valve to the left for conducting pressure in line 250 to act on actuator 534 via lines 540 and 542. This shifts valve 514 to block off communication between passage 248 and passage 519. In this position, fluid in passage 248 is directed to by-pass valve 514 and to flow through passage 424 through restriction 526 and then continue its passage through line 519 to be eventually conducted into the fore end of cylinder 502. A by-pass loop around restrictor 526 is provided to assure that the fluid draining from either the fore or aft end of cylinder 502 is not restrained by the obstruction created by restrictor 526. This will become more apparent in the description to follow. Direction of the traversing piston and hence the oscillating fixture is controlled by directional control valve 518 which responds to the solenoid actuated valve generally indicated by numeral 562. This valve is generally similar to the valve indicated by numeral 282 and responds to the cam actuated switch 564 located on the roller arm 34. Triggering switch 564 energizes either solenoid 566 or 568 depending on whether the rollers are at the trailing or leading edge. When the rollers are adjacent the trailing edge or at the rear end of the machine, solenoid 566 is energized positioning the spool 570 to the right for interconnecting line 250 with actuator 572 via lines 574 and 576 which shifts spool 578 to the right interconnecting lines 519 and 520 directly communicating pressure discharging from restrictor 516 to the left end of cylinder 502 to act on the left end of piston 500.

As was mentioned above, piston 500 being of the half-area design will then travel to the right since the area over which the fluid acts on piston 500 is twice the area of its opposing side. The force acting thereon will be twice the value of the fluid opposing it forcing the piston to move to the right. This causes the fluid acting on the right end of piston 500 to be dumped via line 580 and into line 519. Since the flow to the left side of piston 500 equals the flow out the right side the net flow through 516 is small. To cause the traverse piston 500 to move back to the starting point, that is, from the leading edge back to the trailing edge, solenoid 568 becomes energized directing pressurized fluid into actuator 586 through lines 574 and 588. This connects line 520 to drain so that the fluid on the fore end of piston 500 is directly connected to drain. This creates a pressure drop across piston 500 so that the fluid acting on the right side or the reduced diameter of piston 500 being greater than the pressure acting on the left side, causes the piston, and hence the attached connecting piston rod 504, to move to the left. A pressure regulating valve 590 substantially identical to the other pressure regulating valves described above serves to maintain the pressure in the left end of cylinder 502 at say 500 p.s.i. when the piston is being moved toward the right by virtue of the position of the positional control valve 518.

It will be appreciated that the propeller blades have a shank portion and an airfoil portion and the blade is faired therebetween, the shank portion being substantially circular in cross-section. By the design of this machine, it is possible to cold work the shank portion of the blade and for this purpose the chuck can be continuously rotated. When the longitudinal feed positions the rollers in the proper position by virtue of the control mechanism described therewith, the rollers are energized in their full squeeze position to exert maximum pressure. It will be appreciated further that the rotational movement of the rollers being positioned at the points where the shank is faired toward the airfoil section, causes a large displacement of the rollers. This requires a large amount of fluid to be fed to the squeeze roller cylinder and for this purpose the additional fluid delivered by pump 506 is directed to this cylinder by virtue of the control mechanism generally indicated by numeral 700. This is accomplished by actuating suitable switches by the machine operator which energizes solenoids 702 and 704 for positioning valves 706 and 708 respectively to conduct fluid from pump 506 through line 248, passage 710 into valves 708 and 706, passage 714 and 716 through pressure regulator 718 and into passage 720 and which eventually connects to passage 364 which leads to the hydraulic circuits for the piston cylinder 352. Pressure regulator 718 is substantially like the other pressure regulators described above and serves to maintain the pressure to say 700 p.s.i.

In describing the hydraulic circuit for the various control for the three pistons; namely, the longitudinal feed, the squeeze roller pistons and the traverse feed, for clarity and simplicity the description of various check valves which are necessary for the proper operation of the hydraulic circuits were omitted.

Also it will be noted that a pair of accumulators 730 and 732 are employed to assure that sudden demands of fluid created by the positioning of the various control pistons are met. Since there are standard types of accumulators a detailed description thereof has been omitted. It will be understood that these accumulators merely serve to assure that sufficient fluid is available to meet the demands of the various hydraulic circuits.

Figure 5:
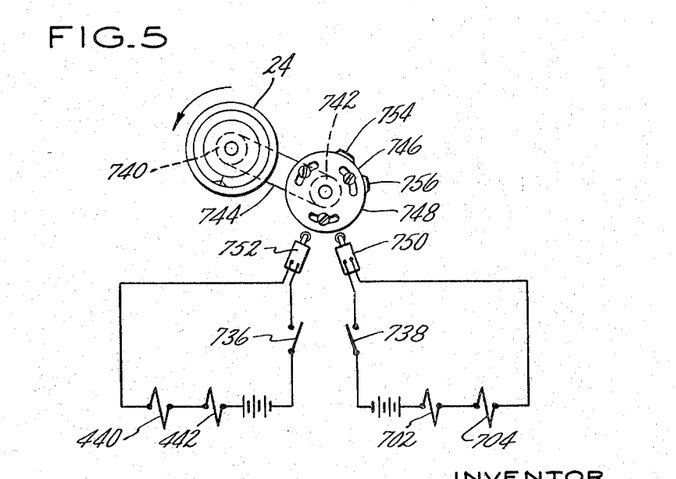
FIG. 5 is a view of a rotary cam which controls the pressure at the edges of a blade when rolling in the transition area between round and airfoil shaped portions of the blade.

As was mentioned above, the blade is cold worked from the tip area toward the shank portion by step feeding the oscillating fixture. The pressure at a point toward the tip is gradually increased along line F as shown in FIG. 7 until it reaches the maximum pressure illustrated by line B. Along the chordwise direction the pressure is decreased along lines G. At the transitional point, the pressure is decreased along line H but prior to obtaining this point, the pressure is increased by virtue of the cam 732 mounted on the front of the machine as indicated in FIG. 1. This cam assures that the pressure shown as line E and B is continuously constant through the length of the blade indicated. It is contemplated by this invention that the machine operator will select the proper feeds, namely, step feed or continuous feed as was described in the above. When this occurs, the continuous feed is actuated and the blade is rotated at a predetermined speed. At this point in order to assure that the leading and trailing edges along the shank portion of the blade are properly pressurized the mechanism in FIG. 4 which is schematically illustrated is actuated. This is accomplished by suitably actuating switches 736 and 738 which, in turn, energize the proper fluid control mechanism shown in FIG. 5. Mounted on the back of spindle 24 is sprocket gear 740 which drives the sprocket gear 742 by virtue of the chain 744. This, in turn, drives a pair of cam plates 746 and 748 which are mounted back to back. Each of the cam plates have an abutment which, in turn, engage one of the switches indicated by numerals 750 and 752. It will be appreciated that the switches are laterally spaced so that abutment 754 engages switch 752 and abutment 756 engages switch 750. As the cams are rotated to engage the cam, the switches are energized so as to energize solenoids 440, 442, 702 and 704 in the proper time relationship. In this manner the pressure is reduced along lines L appearing at the shank and tip portion of the blade. The cam plates are adjustable to determine the space interval between the cams 754 and 756 in order to select the proper distance where the pressure will be reduced along the shank portion.

Reference is now made to FIG. 6 which schematically shows the roller arms and the rollers engaging the blade and showing the camming arrangement for actuating the switching mechanism for reducing the pressure along the leading and trailing edge at the airfoil section of the blades. This is accomplished by using the cam bar 760 which is pivotally mounted about pivot 56 and is secured to the roller arm 36 by the securing member which may take the form of a standard nut and bolt indicated by numeral 764. At the opposite end cam rod 760 carries a pair of adujstable plungers 766 and 768 which are adapted to engage limiting switches 444 and 772. As was described earlier, limiting switch 772 serves to energize solenoids 286 and 288 in order to obtain the incremental feeds associated with the step feed mechanism. As was mentioned earlier, the switches are sequentially actuated in order to port fluid into and out of chamber 176 for positioning the piston member 278. Limiting or solenoid switch 444 responds to the distance between the rollers for energizing solenoids 440 and 442. As was indicated above, when solenoids 440 and 442 are energized, the respective valves 450 and 452 are placed in the position for bleeding fluid from line 368 through line 453 and back to drain. This serves to decrease the pressure in chamber 352 for reducing the pressure. In this manner, the pressures at the trailing and leading edges are reduced as a function of time. When the rollers move traversely across the blade and reach the distance apart for energizing limiting switch 444, the pressure is reduced to a minimum value, say 600 p.s.i. The rollers continue to move until they engage the limiting switch 772 which, in turn, actuates the step feed mechanism for moving the rollers to the next position. Obviously, at this point, the rollers have moved sufficient distance off of the blades which is determined by the time lag built into the various switches and solenoid valves. At the next movement across the blades, the rollers contact the blade and the camming mechanism deenergizes solenoids 440 and 442 and pressure then builds up as a function of time and thickness until it reaches the maximum value, say 800 p.s.i. This operation continues until the surface of the blade has been cold worked the distance indicated in FIG. 7. At the transitional point, the machine operator disengages the step feed mechanism and energizes the continuous feed mechanism and places the blade in a continuously rotating operation which is then controlled by the camming arrangement shown in FIG. 5. The step feed may also be actuated as a function of the translation of the rollers.

It should be understood that the invention is not limited to the particular embodiments shown and described herein, but that various changes and modifications may be made without departing from the spirit or scope of this novel concept as defined by the following claims.

I claim:

1. A machine adapted to increase the fatigue strength life of a metallic blade having a nonuniform surface comprising means for supporting the blade in a rotary and nonrotary position, a saddle movable in sliding longitudinal relation with respect to the blade, an oscillating fixture slidably mounted on the saddle and movable in lateral relation to the blade, squeeze rollers carried by the oscillating fixtures adapted to engage the blade, means including a hydraulic actuated piston for applying pressure to said squeeze rollers and control means for regulating the pressure at a schedule when the oscillating fixture moves laterally with respect to the blade when in a nonrotating position, and additional control means for regulating the pressure at a predetermined schedule when the saddle moves longitudinally with respect to the blade when in a rotating position.

2. A machine adapted to increase the fatigue strength life of a metallic propeller blade having a nonuniform surface including a cylindrical portion fairing to an airfoil portion, means for supporting the propeller blade in a rotating and nonrotating position, a pair of opposing spaced apart squeeze rollers adapted to move laterally and longitudinally with respect to the blade, means for applying pressure to the squeeze rollers at an increasing rate until a maximum value is reached and maintain the maximum value for a predetermined lateral distance and then decreasing the pressure until a minimum value is reached when the squeeze rollers advance transversely across the blade when the blade is in the nonrotating position, means for rotating the blades, and means for applying pressure to the squeeze rollers at a predetermined increased rate until a maximum value is reached and decreasing the pressure until a minimum value is reached when the squeeze rollers advance longitudinally and the blade is in the rotating position.

3. A machine adapted to increase the fatigue strength life of an aluminum or alloy blade having a nonuniform surface comprising means for supporting the blade in a rotary and nonrotary position, a saddle movable in sliding longitudinal relation with respect to the blade, an oscillating fixture slidably mounted on the saddle and movable in lateral relation to the blade, a pair of spaced opposing squeeze rollers carried by the oscillating fixture adapted to engage the blade, means including a hydraulic actuated piston for applying pressure to said squeeze rollers and control means for regulating the pressure at a predetermined schedule when the oscillating fixture moves laterally with respect to the blade when in a nonrotating position, means responsive to the distance between said squeeze rollers for varying said control means, and additional control means for regulating the pressure at a predetermined schedule when the saddle moves longitudinally with respect to the blade when in a rotating position.

4. A machine adapted to increase the fatigue strength life of an aluminum or alloy blade having a nonuniform surface wherein the cross section fairs from a generally circular to elliptical shape comprising means for supporting the blade in a rotary and nonrotary position, a saddle movable in sliding longitudinal relation with respect to the blade, an oscillating fixture slidably mounted on the saddle and movable in lateral relation to the blade, a pair of vertically spaced movable arms supported by said oscillating fixture, mounted on one end of each of said arms, squeeze rollers adapted to engage the blade, means including a hydraulic actuated piston for applying pressure to said squeeze rollers, said piston interconnecting the other end of said arms, control means for regulating the pressure at a schedule when the oscillating fixture moves laterally with respect to the blade when in a nonrotating position, and additional control means for regulating the pressure at a predetermined schedule when the saddle moves longitudinally with respect to the blade when in a rotating position.

5. A machine adapted to increase the fatigue strength life of an aluminum or aluminum alloy propeller blade having a nonuniform surface including a cylindrical portion fairing to an airfoil portion, means for supporting the propeller blade in a rotating and nonrotating position, a pair of opposing spaced apart squeeze rollers adapted to move laterally and longitudinally with respect to the blade, means responsive to the distance between said squeeze rollers for applying pressure to the squeeze rollers at a predetermined increased rate until a maximum value is reached and maintain the maximum value for a predetermined lateral distance and then decreasing the pressure until a minimum value is reached when the squeeze rollers advance transversely across the blade when the blade is in the nonrotating position, means for rotating the blades, and means responsive to the rotation of the blades, for applying pressure to the squeeze rollers at a predetermined increased rate until a maximum value is reached and decreasing the pressure until a minimum value is reached when the squeeze rollers advance longitudinally and the blade is in the rotating position.

6. A machine adapted to increase the fatigue strength life of an aluminum or aluminum alloy propeller blade having a nonuniform surface, means including a chuck for supporting the propeller blade in a rotating and nonrotating position, compressive means including a pair of vertically disposed arms and opposing spaced apart squeeze rollers mounted on each end of said arms adapted to move laterally and longitudinally with respect to the blade, a hydraulic actuator interconnecting each of said arms at the other end thereof adapted to apply pressure to the squeeze rollers at a predetermined increased rate until a maximum value is reached and maintain the maximum value for a predetermined lateral distance and then decreasing the pressure until a minimum value is reached when the squeeze rollers advance transversely across the blade when the blade is in the nonrotating position, means for rotating the blades, and means responsive to the speed of said chuck for applying pressure to the squeeze rollers at a predetermined increased rate until a maximum value is reached and decreasing the pressure until a minimum value is reached when the squeeze rollers advance longitudinally and the blade is in the rotating position.

7. A machine adapted to increase the fatigue strength life of a metallic blade having nonuniform upper and lower surfaces, comprising a machine bed, head and tailstock means supported on said machine bed and being axially spaced from each other, means on said head and tailstock means for supporting the blade, a pair of spaced opposing rollers mounted intermediate said tail and headstock engaging the upper and lower surfaces of said blade means for causing said rollers to move laterally with respect to the axis of said blade, and means responsive to the thickness of the blade for imposing a controlled variable force to said rollers to move them toward each other when they are moving in said lateral direction.

8. A machine adapted to increase the fatigue strength life of a metallic blade having nonuniform upper and lower surfaces, comprising a machine bed, head and tailstock means supported on said machine bed and being axially spaced from each other, means on said head and tailstock means for supporting the blade, a pair of spaced opposing rollers mounted intermediate said tail and headstock engaging the upper and lower surfaces of said blade means for causing said rollers to sequentially move laterally and longitudinally with respect to the axis of said blade, and means responsive to the thickness of the blade for imposing a controlled variable force to said rollers to move them toward each other when they are moving in said lateral direction.

9. A machine adapted to increase the fatigue strength life of a metallic blade having nonuniform upper and lower surfaces, comprising a machine bed, head and tailstock means supported on said machine bed and being axially spaced from each other, means on said head and tailstock means for supporting the blade, a pair of spaced opposing rollers mounted intermediate said tail and headstock engaging the upper and lower surfaces of said blade means for causing said rollers to move laterally with respect to said blade, means responsive to the thickness of the blade for imposing a controlled variable force to said rollers to move them toward each other when they are moving in said transverse direction, and means for indexing said rollers with respect to said blade.

10. A machine adapted to increase the fatigue strength life of a metal blade having nonuniform upper and lower surfaces, comprising a machine bed, head and tailstock means supported on said bed and axially spaced from each other, means on said head and tailstock for supporting said blade, a saddle intermediate said head and tailstock having a pair of spaced opposing rollers adapted to engage the upper and lower surfaces of said blade, means responsive to the thickness of the blade for applying controlled variable force to at least one of said rollers, means for sequentially moving said blade and rollers in an axial and lateral direction relative to each other, wherein said rollers engage said blade when moving in said lateral direction.

References Cited by the Examiner

UNITED STATES PATENTS

| 293,826 | 2/1884 | Way | 29—90 |
| 619,987 | 2/1899 | O'Keefe | 29—90 |

FOREIGN PATENTS 281,821　7/1952　Switzerland.

CHARLES W. LANHAM, *Primary Examiner.*

H. D. HOINKES, *Assistant Examiner.*